(Model.)
F. C. WEIR.
DEVICE FOR MANUFACTURING RAILWAY FROGS.
No. 245,036. Patented Aug. 2, 1881.
4 Sheets—Sheet 1.
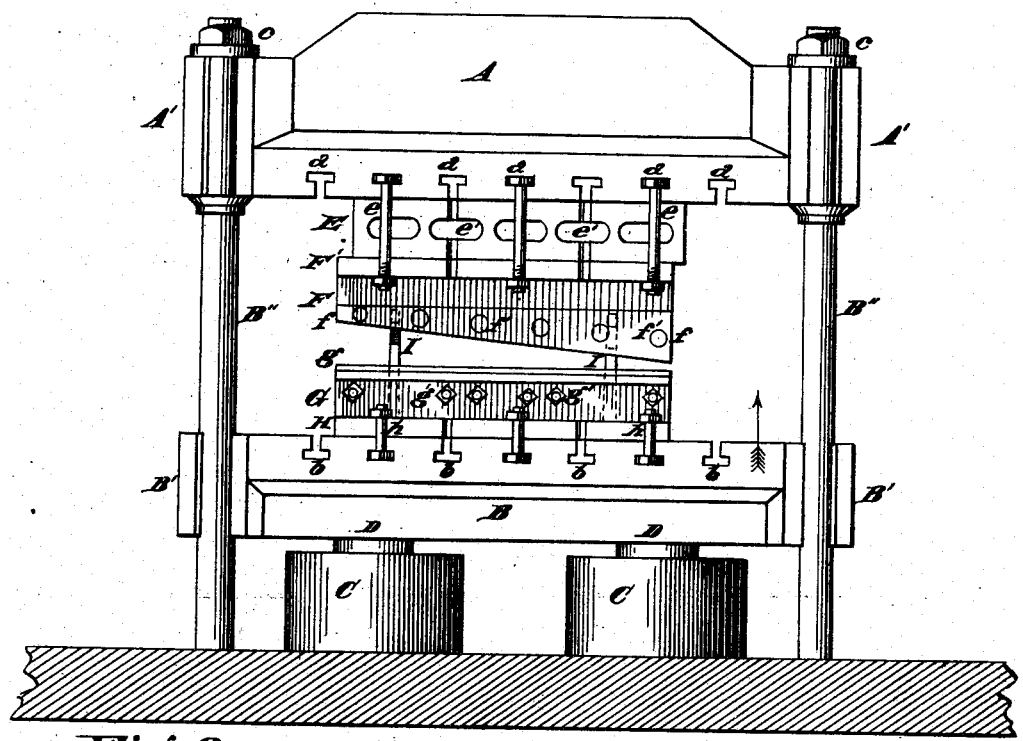
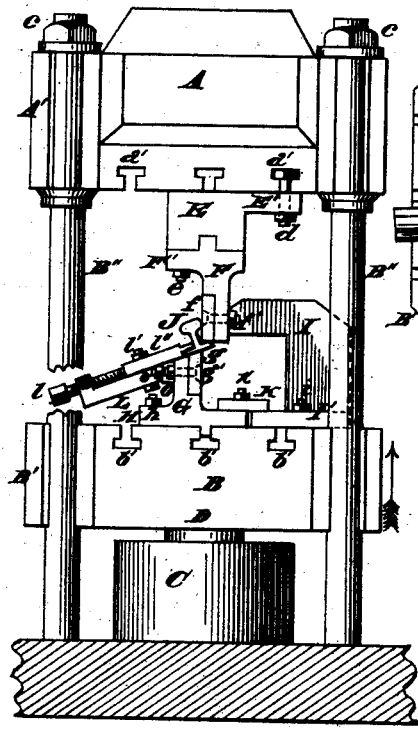
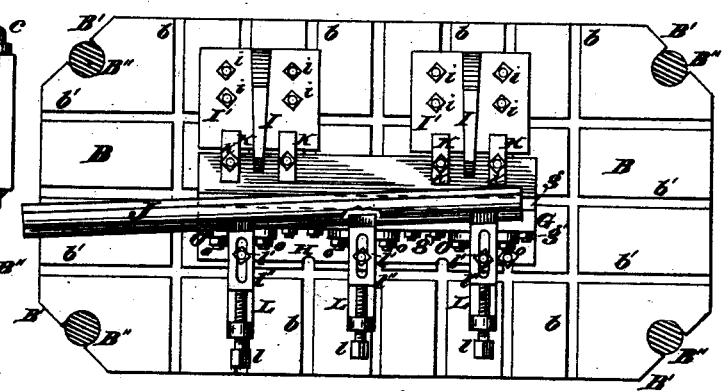
Attest
Jno. L. Jones
J. H. Chas. Smith
Inventor
Fredric C. Weir (Model.)
F. C. WEIR.
DEVICE FOR MANUFACTURING RAILWAY FROGS.
No. 245,036. Patented Aug. 2, 1881.
4 Sheets—Sheet 2.
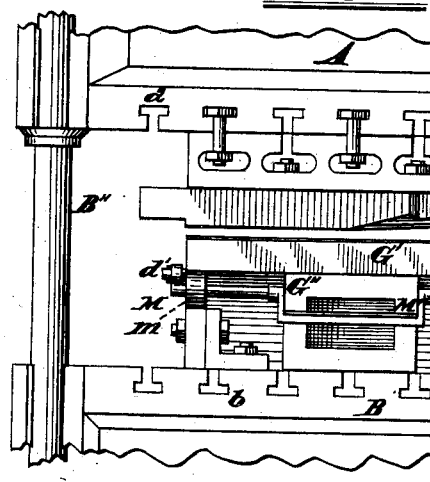
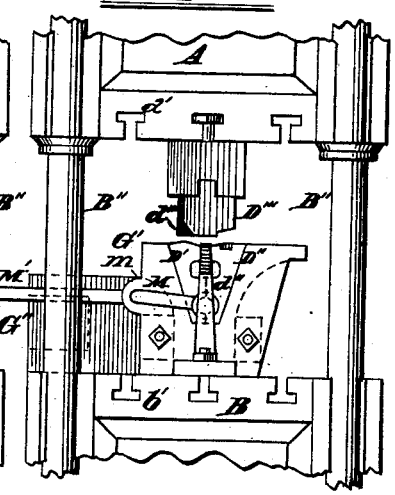
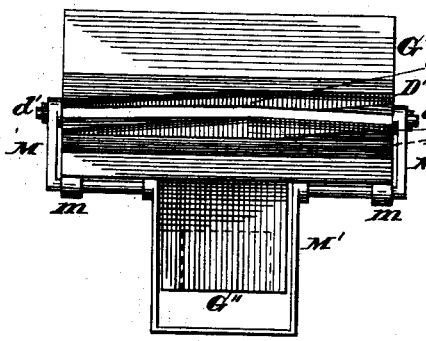
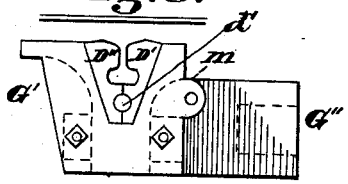
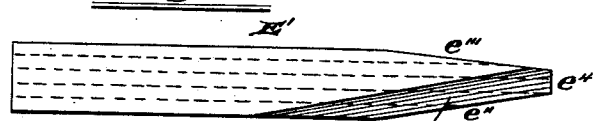
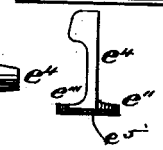
Attest
Jno. E. Jones
J. H. Chas. Smith
Inventor
Fredric C. Weir (Model.)
F. C. WEIR.
DEVICE FOR MANUFACTURING RAILWAY FROGS.
No. 245,036.
4 Sheets—Sheet 3.
Patented Aug. 2, 1881.
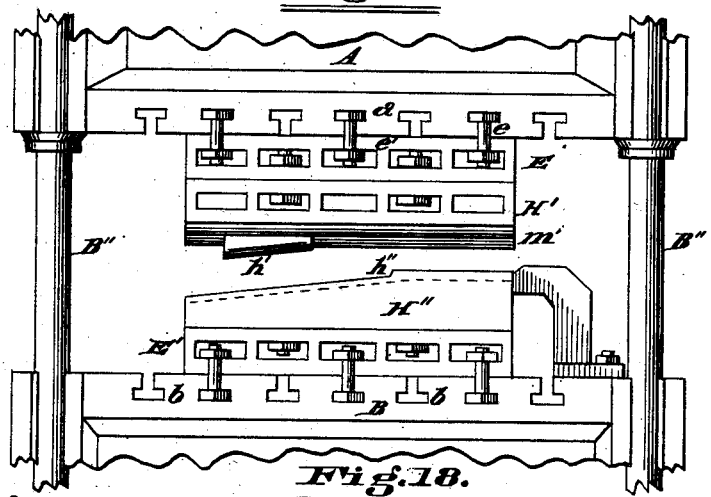
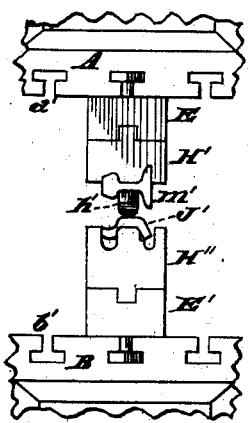
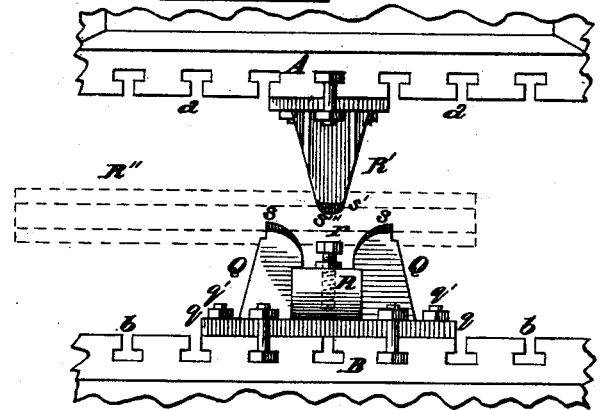
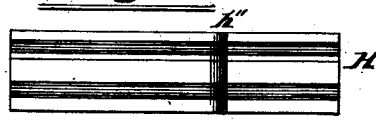
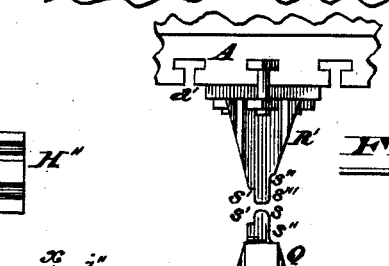
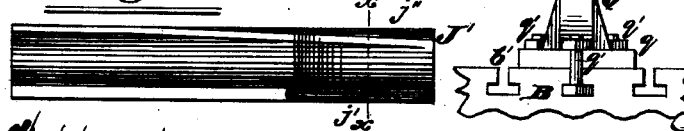
Attest
Jno. E. Jones
J. H. Chas. Smith
Inventor
Fredric C. Weir (Model.)

F. C. WEIR.
DEVICE FOR MANUFACTURING RAILWAY FROGS.

No. 245,036. Patented Aug. 2, 1881.

Attest
Jno. L. Jones
J. H. Chas. Smith

Inventor
Fredric Weir

UNITED STATES PATENT OFFICE.

FREDRIC C. WEIR, OF CINCINNATI, OHIO.

DEVICE FOR MANUFACTURING RAILWAY-FROGS.

SPECIFICATION forming part of Letters Patent No. 245,036, dated August 2, 1881.

Application filed July 24, 1880. (Model.)

*To all whom it may concern:*

Be it known that I, FREDRIC C. WEIR, of Cincinnati, in the county of Hamilton and State of Ohio, have invented certain new and useful Improvements in Devices for Manufacturing Railway-Frogs, of which the following is a specification.

My invention relates to a process and the machinery for making railway-frogs out of ordinary rails, so that the several pieces composing the frog can be got out in quantities by machinery, and the pieces readily put together, dispensing with hand-fitting.

The process part of my invention consists of three distinct steps, which are successively carried out by proper machinery.

The first step consists in shearing or cutting off the flanges of the point-rails by means of shears operated by a powerful press, and after the flanges of the point-rails are cut to the proper angle the head of the rail is cut in nearly the desired shape by the same means.

A second step consists in shaping the point of the short point-rail to fit against the main point-rail, which is done by dies operated in a powerful press. This portion of my invention is very essential, as it is impossible to shear or cut the rails so that they may fit and form a close joint capable of supporting the strain without additional shaping.

A third step consists in bending the main point-rail and the wing-rails in by means of dies organized so as to be adjusted to obtain any desired angle, and operated by the same or a similar press used in cutting and shaping the rails.

Other features of my invention relate to improvements in the mechanical appliances used in the different steps of my process, and they will be fully explained in the description of the accompanying drawings.

The object of my invention is to cut, shape, and bend the several parts of a railway-frog by machinery in quantities, so that each part of the frog is a duplicate of the same member in all frogs of any given size and style, avoiding the slow and expensive method of milling or planing off the flanges, or of heating and cutting with cold-chisels, and dispensing with blacksmith work, enabling the frogs to be made not only much cheaper but much more durable, owing to the accurate fitting of the parts, making close, strong joints and level work.

In the accompanying drawings, Figure 1 is a vertical longitudinal elevation, showing my improved machine with the shearing devices in position for the cutting process. Fig. 2 is a vertical transverse elevation of the same, showing the rail in position for shearing. Fig. 3 is a plan view of the movable platen, with the posts or guides in section, showing the rail secured in the proper position for shearing or cutting the flanges by means of adjusting-clamps. Fig. 4 is a plan or top view of the rail, with the point end partly broken and in section, to show the manner of cutting the flange by the shearing process. Fig. 5 is a vertical longitudinal elevation of my machine, showing the shaping-dies and their accessories in position for shaping the flanges of the short point-rail. Fig. 6 is a vertical transverse elevation or end view of the same. Fig. 7 is a plan view of the dies and die-supporting block, showing the crank-levers holding the dies open for the reception of the rail. Fig. 8 is a longitudinal view of the bottom face of the upper die. Fig. 9 is an end view of the shaping-dies and die-supporting block, the reverse end to that shown in Fig. 6. Fig. 10 is a longitudinal view of the bottom of the short point-rail, showing the manner of shaping the flange by the shaping process. Fig. 11 is a plan or top view of the same, shown partly broken. Fig. 12 is an end view of the same. Fig. 13 is a vertical longitudinal elevation of my machine, a part of which is broken away, showing the shaping-dies and their accessories in position for shaping the short point-rail. Fig. 14 is a vertical transverse elevation of the same, showing the rail in position of shaping. Fig. 15 is a plan view of the lower shaping-die. Fig. 16 is a longitudinal elevation of the short point-rail after shaping, showing it with the head downward. Fig. 17 is a cross-section of the short point-rail on line *x x*, Fig. 16, but reversed. Fig. 18 is a longitudinal elevation of my machine, partly broken, showing the bending-devices in position for bending the rails, a rail being shown in dotted lines indicating its position in the dies before bending. Fig. 19 is a transverse elevation of the same. Fig. 20 is a plan view of the rail after bending. Fig. 21 is a longitudinal elevation of a portion of my machine, showing the position of and manner of securing the dies for forming the channel-irons. Fig. 22 is an end view of the upper die, edging-tools or plates, and the filling-blocks. Fig. 23 is an end view of the lower die, showing the channel-iron in position after forming. Fig. 24 is a plan view of the lower die. Fig. 25 is a plan view of one form of channel-iron complete, and Fig. 26 is a plan view of another form of channel-iron complete.

Figs. 1, 2, and 3 are different views of my shearing machinery, which are shown attached to the platens of a powerful hydraulic press, which I deem to be the best form of press with which to carry out my invention.

A represents the stationary platen or press-beam; B, the platen; B″ B″, the side columns sustaining the beam A, and forming guide-rods for platen B.

C C represent ordinary cylinders, fitted in the usual manner, with the common water-pistons D D used in such presses, and operated in the usual manner.

The platens are each provided with T-shaped slots, represented by $a\ a'$ and $b\ b'$.

$e\ h$ represent bolts placed in the T-slots for attaching the filling-blocks and tool-stocks to the press-platens.

E represents a filling-block attached to platen A; F, a stock attached to block E; $f$, a shear attached to the stock F by means of bolts $f'$.

G represents a stock adjustably attached to the platen B; $g$, a shear-blade secured to stock G by bolts $g'$.

L represents a clamp-frame firmly secured to shear-stock G.

$l''$ represents a series of adjustable clamps secured to frame L by bolts $l'$, the clamps $l''$ being provided with slots, so that they can be adjusted by screws $l$. By tightening bolts $l'$ the rail is clamped securely in position for shearing. The shear-blades and the stocks must be made very heavy, so as to withstand a very powerful pressure.

I represents a guide-brace, securely bolted to the platen B and supporting the back of shear and stock $f$ F, effectually preventing the spreading of the shears $f$ and $g$ under the heavy cutting pressure to which they are subjected.

Figs. 2 and 3 show the short point-rail in position for cutting off the surplus portion of the flange. In order to cut off a sufficient portion the rail has to be introduced at an angle, as shown in Fig. 2. After the flange is cut off the rail is turned over and clamped in position on stock G, and the head is sheared off in like manner to form the point.

To secure the angular cutting of the flange and to hold the rail firmly the stock G and shear $g$ are beveled as shown in Fig. 2. The flanges of the main point-rail are cut in a similar manner.

Fig. 10 shows a plan of the short point-rail with both flanges cut off, and Fig. 11 is a top plan view, showing the head of the rail cut off ready for shaping.

Fig. 12 is an end view of the short point-rail cut as shown in Fig. 11.

Figure 21:
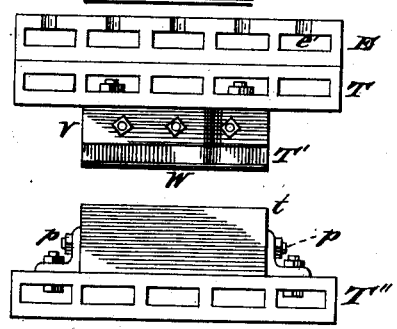

The main point-rail can be shaped in a similar manner by means of proper dies; or the shaping can be all made in the short point-rail, causing it to conform to the sharpened main point-rail.

The mechanical appliances shown in the drawings are peculiarly adapted to making frogs in accordance with Letters Patent No. 215,548, granted me May 20, 1879, reissued September 30, 1879, in which case it is necessary to shape the flanges of the short point-rail to rest upon the main point-rail. To accomplish this I have prepared flange shaping dies, which are shown in Figs. 5, 6, 7, 8, and 9, Sheet 2. They are shown attached to a hydraulic press of the same construction as that shown on Sheet 1.

G′ represents the die-supporting block provided with a flaring groove.

D′ D″ represent duplex female die-blocks, hinged by rod $d'$, running longitudinally through block D′ D″. Rod $d'$ projects through the die-blocks a sufficient distance to allow cranks or lifting-levers M to be securely attached to its ends.

M′ represents a bail for uniting and operating the lifting-levers M.

$m\ m$ represent journal-bearings rigidly secured to die-block G′. The head of the rail rests in rail-shaped grooves made in the inner face of dies D′ D″.

D‴ represents a male die for co-operating with the female dies D′ D″. The top faces of the female dies are formed with depressed portions $d^2\ d^2$, and the male die is formed with a projecting portion, $d^3$, corresponding thereto, and the co-operative action of the dies is to form a diagonal recess or depression, $e^5$, in the bottom of the flange of the short point-rail, as shown in Figs. 10 and 12, whereby said flange is enabled to fit over and rest upon the flange of the main point-rail.

To insert the rail between the dies D′ D″ the bail M′ is depressed, which raises rod $d'$ and die-blocks D′ D″, which open by gravity as they are raised out of bed-block G′. When the rail is inserted, dies D′ D″ are lowered and the press-platen is raised, bringing dies D′, D″, and D‴ together, pressing the flanges of the rail into shape by means of the pressure applied through the platen.

The rail should be heated before being subjected to pressure between the dies. After the flanges are thus shaped platen B is lowered, the dies D′ D″ raised, the rail taken out, and the dies are then ready for shaping a second one. After the flanges and head are properly cut and shaped, it is necessary to shape the head and web of the short point-rail to closely fit those of the main point-rail. This shaping is accomplished by means of suitable dies operated in a powerful press, and I employ a similar press as that shown for shearing the flanges. Sheet 3, Figs. 13 and 14, show these shaping-dies.

H′ represents the stationary die attached to the platen A, the shaping part being of the same configuration as the rail to which the short point-rail is to be fitted. I employ a short steel rail to form the face of this die H'.

H" represents the lower die attached to the movable platen B. The shaping portion of die H" has exactly the reverse configuration of the rail-die H', but with a groove to receive the flange of the rail m' of the forming-die H', and closely fitting the side of the flange to prevent its spreading under the heavy pressure exerted on the dies.

J' represents the end of the short point-rail to be shaped between dies H' H". As the short point-rail is to join the main point-rail at an angle to the plane of the tread, the face of die H" must be made to give such an angle as shown in Fig. 13.

h' represents a stop, which holds the main portion of the short point-rail down on die H", giving it the required angle while the point is being shaped by the dies.

The main point-rail and the wing-rails are bent to the desired angle by means of bending-jacks. (Shown in Figs. 18 and 19.)

Q Q represent upright standards with flanges q, through which pass bolts q', securing them rigidly to the platen B of the press.

s s represent horns, which are made with their faces fitting the concave portion of the rail between the head and flange.

s' s' represent offsets or ledges on the sides of horns s s, for supporting the head of the rail in the operation of bending.

s" s" represent ledges on the opposite sides of horns s s, for supporting the flange of the rail.

R represents a block placed between anvils or standards Q Q.

r represents an adjustable stop, the regulation of which determines the angle to which the rails are bent.

R' represents a bending-stud attached to the top platen, A, of a press. Its face is covex to fit the opposite concave portion of the rail, and it is provided with ledges s' s" opposite the similar parts on the horns s. The parts R' s' s" clamp the rail on each side and bend it between the horns s s to form the desired angle, which is determined by the setting of the stop r.

Figure 22:
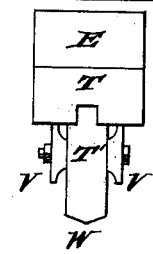
Figure 23:
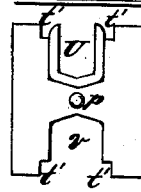
Figure 24:
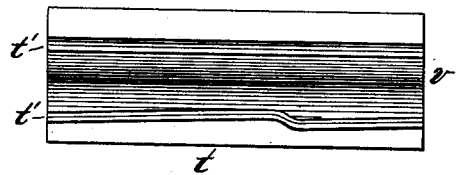

Figs. 21, 22, and 23, Sheet 4, represent dies for bending channel-irons into proper shape to unite the point to the wing-rails. (Shown in my aforesaid patent of 1879.)

T represents a filling-block; T', the male die; t, the female die; U, the bent channel-iron; W, the face of the male die.

V V represent edging-dies for rounding off the edges of the channel-iron, and which is done in the act of bending.

t' t' represent grooves cut in the face of the female die to receive the thrust of the edging-tools.

Figure 25:
Figure 26:

The configuration of the dies T' t determines the shape of the channel-irons, the preferred form of which are shown in Figs. 25 and 26. These dies, it should be mentioned, operate to give the initial shape to the metal blank, as well as to impart the ultimate completed form to the article.

It will be apparent that the cutting-shears, shaping-dies, and bending-jacks can be arranged and shaped to make the ordinary railway-frog, or any other patented form of frog, instead of the one herein shown.

The bolt-holes in the several parts of the frog are made in the usual manner.

By my process the shearing off of the flanges is done cold. By the old form the rails were heated, requiring frequently several heats to perform the work. This frequent heating has a tendency to change the temper and fibrous texture of the metal, causing the rails to wear uneven and more rapidly. Another plan sometimes employed is planing or milling off the surplus metal, which is a very slow process, rendering it difficult to duplicate the several parts.

By my process of shearing and shaping the point-rails to fit each other a closer and more accurately fitting of joints is obtained, making not only a better but a much cheaper frog.

Another advantage of my process of bending any desired angle of wing or point rail can readily be obtained, thus enabling repairs of parts to be easily made.

Having thus described my invention, what I claim is—

1. An improvement in the art of making railway-frogs from rails, consisting in cutting off the flanges and heads of the point-rails by means of shears, shaping said point-rails in dies so as to form the taper or point joint, and bending to the proper angles the several parts of the frog by means of bending-jacks, the said shears, dies, and bending-jacks being all operated by a powerful press or presses, substantially as described, for the purpose specified.

2. An improvement in the art of making railway-frogs from short sections of rails, consisting in cutting by shears the flanges and head of the point-rails, shaping by means of dies the flanges of the short point-rails so that said rail will partially rest upon the flange of the main point-rail, fitting by means of dies the taper points of the rails to each other, and bending by means of bending-jacks the several sections to the desired angle, said shears, dies, and bending-jacks being operated by a powerful press or presses, substantially as described, for the purpose specified.

3. In appliances for making railway-frogs, the combination, with a powerful press or presses, of shears for cutting the flanges and heads of the point-rails, shaping-dies for shaping the flanges of the short point-rail, so as to enable said rail to rest upon the flange of the main point-rail, dies for fitting the taper points of the rails to each other to form the taper or point joint, and bending-jacks for bending the various parts to the desired angles, substantially as described.

4. In combination with the press-platen and pressure-plate, the shears $f$ $g$ and clamps L $l''$, for shearing the flanges and heads of the point-rails of railway-frogs, substantially as and for the purposes herein set forth.

5. In combination with a press-platen and press-plate, the female dies D' D'' and the male die D''', all constructed as described, for shaping the flange of the short point-rail to partially fit and rest upon that of the main point-rail, substantially as herein set forth.

6. In combination with the press-platen and press-plate, the dies H' $m'$ and $h'$ and H'' $h''$, for shaping the head, web, and flanges of one point-rail to accurately fit the other point-rail, substantially as herein set forth.

7. A jack for bending railway-rails composed substantially of the press A B, supporting-horns $s$ $s$, stud R', and adjustable stop $r$, constructed and combined as herein set forth.

8. The channel-dies T $t$, with grooves $t'$, and edging-tools V, for bending and finishing the channel-irons, substantially as herein set forth.

In testimony whereof I have hereunto set my hand in the presence of two subscribing witnesses.

FREDRIC C. WEIR.

Witnesses:
JNO. E. JONES,
J. H. CHAS. SMITH.